United States Patent
Ims et al.

(10) Patent No.: US 6,505,200 B1
(45) Date of Patent: Jan. 7, 2003

(54) APPLICATION-INDEPENDENT DATA SYNCHRONIZATION TECHNIQUE

(75) Inventors: Steven D. Ims, Apex, NC (US); Yongcheng Li, Raleigh, NC (US); Yih-Shin Tan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 09/611,030

(22) Filed: Jul. 6, 2000

(51) Int. Cl.$^7$ .............................................. G06F 17/30
(52) U.S. Cl. ........................ 707/8; 707/203; 707/204; 707/2; 707/3; 707/4
(58) Field of Search ........................... 707/8, 203, 204, 707/3, 2, 4

(56) References Cited

U.S. PATENT DOCUMENTS

| | | | | | |
|---|---|---|---|---|---|
| 4,432,057 A | * | 2/1984 | Daniell et al. | ............... | 364/300 |
| 5,418,966 A | * | 5/1995 | Madduri | ..................... | 395/725 |
| 5,586,310 A | * | 12/1996 | Sharman | ........................ | 707/8 |
| 5,664,176 A | * | 9/1997 | Madduri | ........................ | 707/8 |
| 5,884,324 A | * | 3/1999 | Cheng et al. | ................... | 707/1 |
| 5,913,213 A | * | 6/1999 | Wikstrom et al. | ............. | 707/8 |
| 5,956,489 A | * | 9/1999 | San Andres et al. | .... | 395/200.51 |
| 5,995,980 A | * | 11/1999 | Olson et al. | ................. | 707/201 |
| 6,012,059 A | * | 1/2000 | Neimat et al. | .................. | 707/8 |
| 6,049,809 A | * | 4/2000 | Raman et al. | ............... | 707/203 |
| 6,189,011 B1 | * | 2/2001 | Lim et al. | .................... | 707/102 |
| 6,243,715 B1 | * | 6/2001 | Bogantz et al. | ............. | 707/201 |
| 6,301,589 B1 | * | 10/2001 | Hirashima et al. | .......... | 707/204 |
| 6,324,580 B1 | * | 11/2001 | Jindal et al. | ................ | 709/228 |
| 6,327,622 B1 | * | 12/2001 | Jindal et al. | ................ | 709/228 |
| 6,401,178 B1 | * | 6/2002 | Gagne et al. | ............... | 711/162 |
| 6,411,966 B1 | * | 6/2002 | Kwan et al. | ................ | 707/201 |

* cited by examiner

Primary Examiner—Frantz Coby
(74) Attorney, Agent, or Firm—Jeanine S. Ray-Yarletts; Marcia L. Doubet

(57) ABSTRACT

A method, system, and computer program product for automatically synchronizing data between a replicated version and a back-end data store version which may or may not have the same format. Queues are used for scheduling refreshes of read-access objects and updates of write-access objects, where the actual processing will occur when the client device connects to the back-end data source. This technique is application-independent, and does not require writing application-specific code to perform a synchronization between data stores having dissimilar storage formats. This technique is particularly advantageous for mobile computing devices, which may operate primarily in a disconnected mode, and for distributed branch-office computing environments where a local server has a replicated copy of data stored at a back-end enterprise system. This technique is also advantageous where the back-end data source uses legacy host application or database storage formats, and where the client software uses modem object-oriented data storage formats. A technique is defined for offloading the processing to a remote machine.

45 Claims, 7 Drawing Sheets

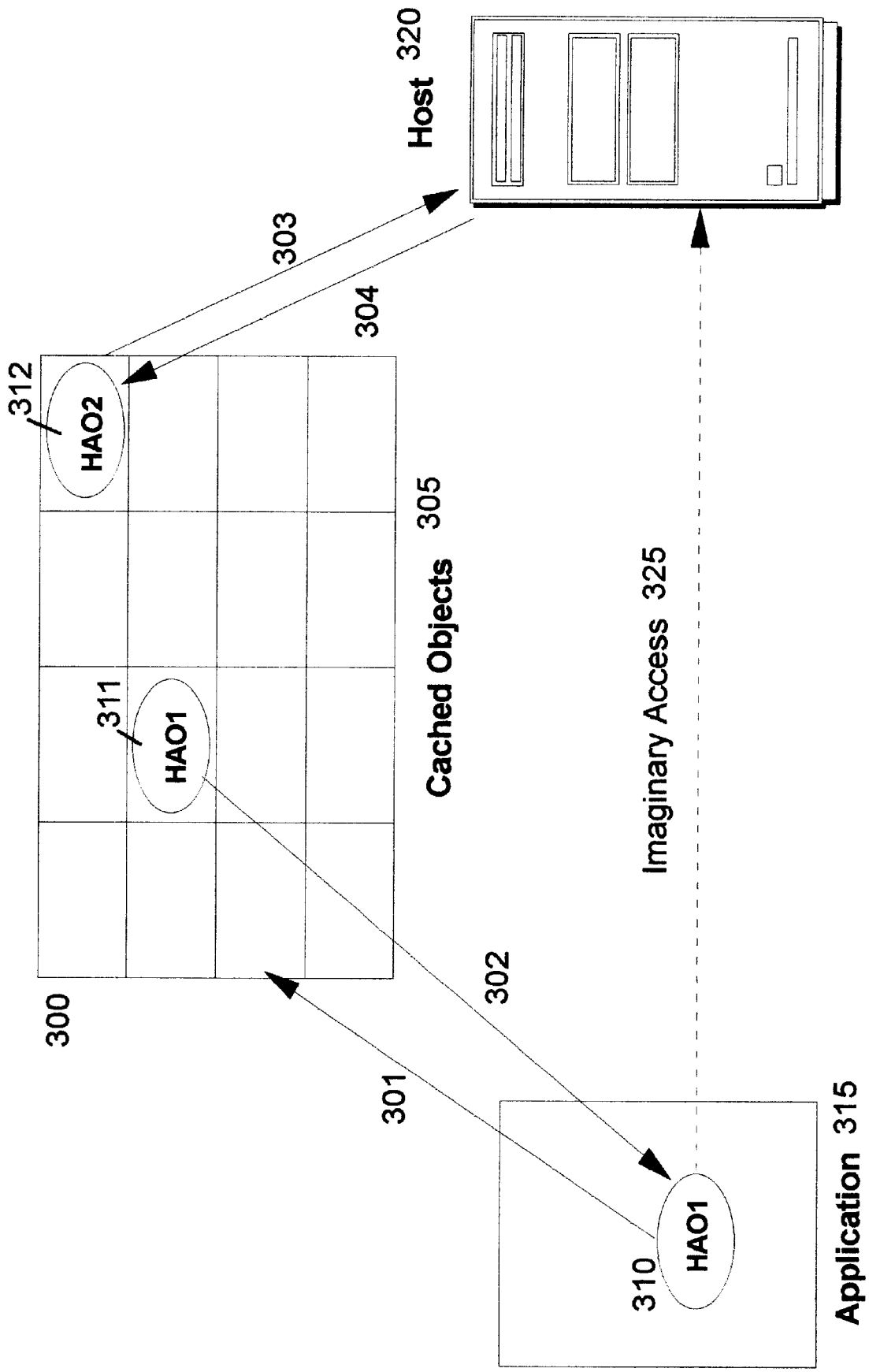

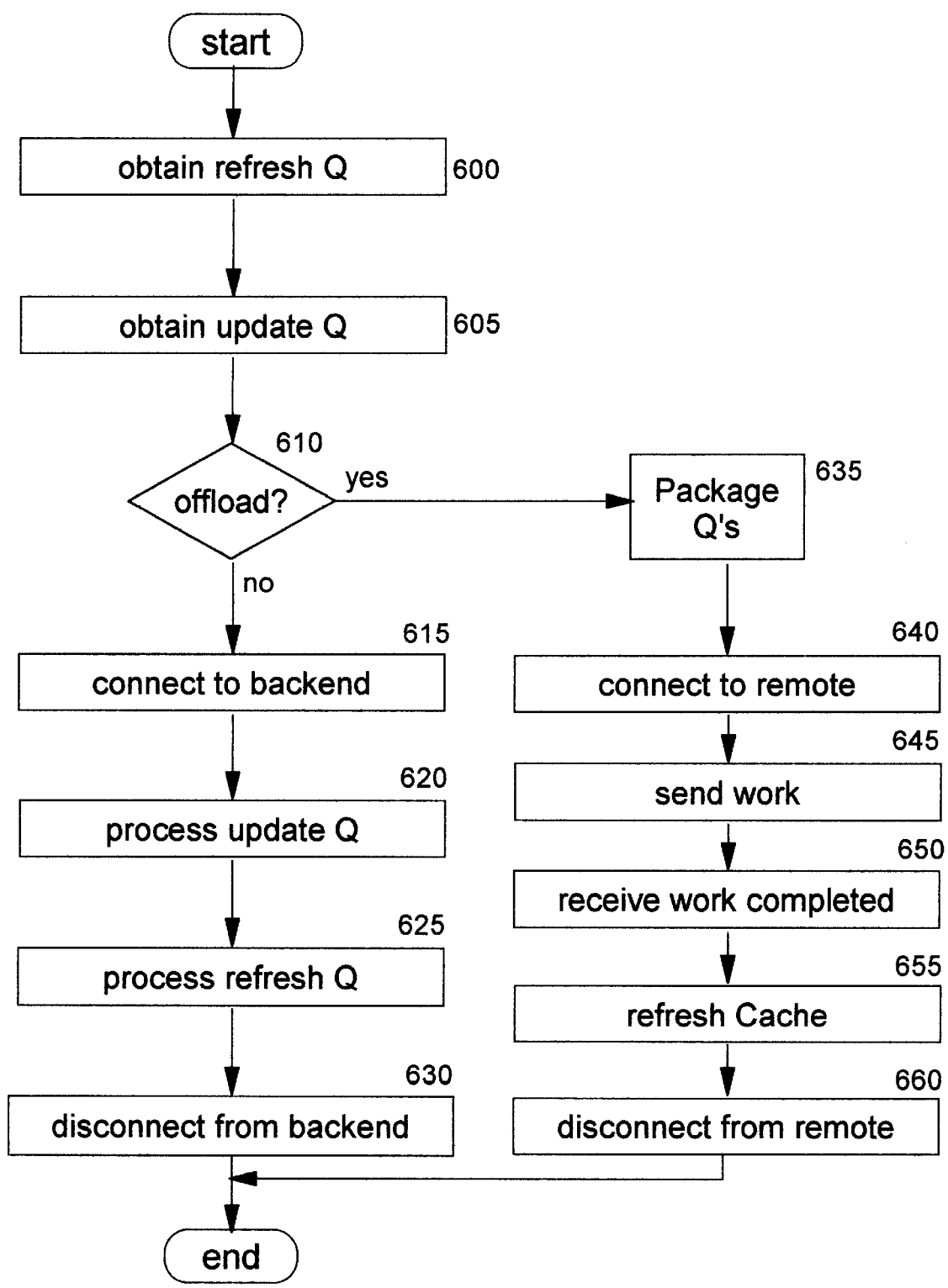

APPLICATION-INDEPENDENT DATA SYNCHRONIZATION TECHNIQUE

RELATED INVENTIONS

The present invention is related to U.S. application entitled "Caching Dynamic Content" (Ser. No. 09/518,474), which was filed on Mar. 3, 2000 now pending; U.S. application, entitled "Object Caching and Update Queuing Technique to Improve Performance and Resource Utilization" (Ser. No. 09/611,157), filed concurrently herewith; and U.S. application, entitled "Self-Propagating Software Objects and Applications" (Ser. No. 09/610,513), also filed concurrently herewith. These related inventions are all commonly assigned to International Business Machines Corporation (IBM), and are hereby incorporated herein by reference.

BACKGROUND OF THE INVENTION

1. Field of the Invention

The present invention relates to a computer system, and deals more particularly with a method, system, and computer program product for applicant-independent, automatic synchronization of data between a replicated version and a back-end data store version which may or may not have the same format. Queues are used for scheduling refreshes of read-access objects and updates of write-access objects, where the actual processing will occur when the client device connects to the back-end data source.

2. Description of the Related Art

Business and consumer use of distributed computing, also commonly referred to as network computing, has gained tremendous popularity in recent years. In this computing model, the data and/or programs to be used to perform a particular computing task typically reside on (i.e. are "distributed" among) more than one computer, where these multiple computers are connected by a network of some type. The Internet, and the part of the Internet known as the World Wide Web (hereinafter, "Web"), are well-known examples of this type of environment wherein the multiple computers are connected using a public network. Other types of network environments in which distributed computing may be used include intranets, which are typically private networks accessible to a restricted set of users (such as employees of a corporation), and extranets (e.g., a corporate network which is accessible to other users than just the employees of the company which owns and/or manages the network, such as the company's business partners).

The client/server model is the most commonly-used computing model in today's distributed computing environments. In this model, a computing device operating in a client role requests some service, such as delivery of stored information, from another computing device operating in a server role. The software operating at one particular client device may make use of applications and data that are stored on one or more server computers which are located literally anywhere in the world. Similarly, an application program operating at a server may provide services to clients which are located throughout the world. A common example of client/server computing is use of a Web browser, which functions in the client role, to send requests for Web pages or Web documents-to a Web server. Another popular model for network computing is known as the "peer-to-peer" model, where the requester of information and the provider of that information operate as peers.

Whereas the HyperText Transfer Protocol (HTTP) is the communications protocol typically used for communication between a client and a server in the client/server model used in the Web, a protocol such as Advanced Program-to-Program Communication (APPC) developed by IBM is typically used for communication in a peer-to-peer model.

Application integration middleware technology has been developed for use in these distributed computing environments to enable application programs to efficiently and conveniently interact with legacy host applications and/or legacy host data stored in a back-end data store (such as a database, directory, or other data storage repository). For the legacy host environment, for example, software components written as objects are being developed to access legacy host data, where these objects enable replacing procedural language software developed for prior computing architectures (such as the 3270 data stream architecture). These objects are then executed by the middleware. Examples of middleware technology include the Host Integration product (and its Host On-Demand and Host Publisher components) and the WebSphere™ product, both from IBM, which can be used to access back-end data sources including CICS® (Customer Information Control System) host applications and JDBC (Java™ Database Connectivity) databases. ("CICS" is a registered trademark of IBM, "WebSphere" is a trademark of IBM, and "Java" is a trademark of Sun Microsystems, Inc.) Application middleware of this type serves as a surrogate for the back-end data source, and provides a consistent interface to its callers. It maintains connections to one or more of the back-end data sources, enabling quick and efficient access to data when needed by an executing application. That is, when a client application (or requesting application, in a peer-to-peer model) requests information or processing, the middleware starts a process to interact with the back-end data source across a network connection to get the information needed by the caller. In this interaction with the back-end data source, the middleware typically functions in the client role, as the surrogate of the requesting client which initiated the request. (Note: the term "back-end data source", as used herein, refers to data stores as well as to applications which create and/or return data to a requester. The term "back-end" as used herein refers to legacy host systems as well as to database systems.)

Many examples of this computing approach exist. As one example, WebSphere applications developed using the Enterprise Access Builder ("EAB") component of IBM's VisualAge® for Java product include back-end data source connector objects which are used to get back-end source information from EAB-created JavaBeans™. ("VisualAge" is a registered trademark of IBM, and "JavaBeans" is a trademark of Sun Microsystems, Inc.) As another example, Host Publisher applications may operate to get back-end source information from the "Integration Objects" which are created using its Design Studio component. (Integration Objects are application-specific encapsulations of legacy host access code,. or database access code, specified as reusable JavaBeans. These Integration Objects are designed for enabling remote client access to the back-end data source.) In a more general sense, any middleware application can use a Host Access Session bean with a Macro bean to get back-end source information which is described using a Host Access macro script. (A "Host Access Session bean" is a bean created for establishing a session that will be used for accessing a back-end data source. A "Macro bean" is a bean which, when executed, plays out the commands of a macro. Instances of these Host Access Session and Macro beans may be created using classes provided by IBM's Host On-Demand product. A "Host Access macro script" is a recording of macro commands that may be used to access data via a host session. For example, a macro may be used to record the log-on sequence used to log on to a host application. This sequence typically includes actions such as establishing a network connection to a host application; prompting the user for his or her identification and password; and then transmitting the information entered by the user to the host application over the network connection. The macro transforms the sequence into commands. When using a Macro bean, the log-on process occurs as the macro commands are executed by the bean. The Macro bean insulates the legacy host code from the object-oriented environment of the requesting client: the legacy code interacts with the macro commands as if it was interacting directly with a user whose device is using, for example, a 3270 protocol for which the legacy code was originally designed. The client never sees the legacy code. Additional host access macro scripts may be created to perform other host interaction sequences.)

Use of application middleware in a distributed computing environment provides a number of advantages, as has been described briefly above and as will be understood by one familiar with the art. However, there are several shortcomings in this approach as it exists in the prior art. One problem of the prior art is in the area of system performance; another is in programming complexity. The performance concern is due to the requirement that the middleware needs to be connected to the back-end system, and to interact in real time for the information requested by its callers. This requires a considerable amount of computing and networking resources.

Furthermore, there may be repeated requests for retrieval of the same information. If repetitively requested information tends to be somewhat static in nature, it is an inefficient waste of system resources to interact with the back-end system each time it is requested, only to retrieve the same result that was obtained with a prior request. In addition, an application program may generate updates to a back-end data store which are not time-critical. An example of this type of application is one that generates low-priority processing requests such as daily purchase orders, where it might not be necessary to process the orders immediately: rather, delayed execution could process the orders and send confirmations messages to the initiators. Many other examples of applications which generate updates that do not require immediate, real-time processing exist. For such applications, it may be preferable for the updates to be accumulated over time and processed when the receiving computing system is lightly loaded, enabling the system's scarce resources to yield to higher-priority tasks in the interim. The prior art does not provide general solutions for optimizing resource utilizations in this manner. Instead, a developer must manually code logic to optimize resource usage, in view of the needs of a particular application, leading to complex (and therefore error-prone) programming requirements. The related U.S. application Ser. No. 09/518,474 entitled "Caching Dynamic Content" (referred to hereinafter as the "first related invention") defines a technique for caching objects (which may be JavaBeans) to avoid the system overhead of repetitive retrieval of information which has not changed. While the technique disclosed therein provides an efficient way to deal with read access to objects, it does not address write access.

An additional problem of the prior art occurs when applications execute in a disconnected mode. "Disconnected mode", as used herein, refers to an execution mode where a client device on which an application is executing might not be currently connected to the code which performs the actual update of the affected back-end data store, and where data from the back-end system has been replicated such that the application on the client device can access this replicated copy.

This execution model is common in distributed "branch office" environments, where the computing devices within a branch office (or some analogous subset) of an enterprise may be connected together using a local area network (LAN) or similar network, but real-time transactions do not typically occur between those computing devices and the back-end enterprise system. Instead, a branch office network typically has a replicated copy of the data which is stored at the back-end system (where this replicated copy may be stored, e.g., at a branch office server), so that the local operations which occur within the branch operate against this local copy. At a designated processing time (for example, at some point following the end of the business day), the local copy is then brought into synchronization with the back-end system. This synchronization process of the prior art is application-specific, requiring either (1) copying of data from the local store to the back-end store, where each store has an identical format, or (2) writing application-specific code to perform a synchronization process between data stores having a dissimilar format.

The disconnected execution model may also be used where the client device is an occasionally-connected mobile computing device (also referred to as a "pervasive computing" device), such as a handheld computer. This type of computing device may store a local replicated copy of the data upon which its applications operate. At some point, the mobile device must connect to the back-end store so that the local copy can be synchronized with the copy from which it was replicated, similar to the approach described above for a branch office server.

The inventors know of no technique with which an arbitrary replicated data source can be automatically synchronized with a back-end data source which does not share a common file format. Client software which is developed to interact with legacy host or database access software at a back-end system is unlikely to use a storage format which is identical to that used at the back-end, thus necessitating creation of application-specific code for the synchronization process of the prior art. In particular, modern object-oriented client front-end software is one example where the file formats used for data storage will be different from that of the back-end.

Accordingly, there is a need for solving the above-described problems of inefficient, complex update access to a back-end data store and application-specific synchronization approaches for synchronizing replicated data with a back-end store.

SUMMARY OF THE INVENTION

An object of the present invention is to provide a technique whereby one data store can be automatically synchronized with another data store, even though the two stores may not share a common format.

Yet another object of the present invention is to provide this technique wherein one of the data stores is a replicated version of data used in disconnected operations, and the other data store is a back-end data store.

A further object of the present invention is to provide this technique wherein the replicated version uses object-oriented data objects for its storage format and the back-end data store uses legacy host data or database storage formats.

Another object of the present invention is to provide this technique in a generic manner such that a developer is not required to write application-specific synchronization code.

Still another object of the present invention is to provide this technique such that the synchronization process can be offloaded to a device other than the one which stored the replicated version.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a computer program product, a system, and a method for automatically synchronizing data between a replicated version and a back-end data store version which may or may not have the same format. This technique comprises: storing one or more first objects as replicated read-access objects in a first cache for responding to read requests against the first objects, wherein (1) a set of input properties and values thereof is stored with or associated with each replicated read-access object and (2) refresh logic specifying how to refresh each of the replicated read-access objects is stored with or associated with the replicated read-access object or a group of replicated read-access objects; storing one or more second objects as replicated write-access objects in a second cache for responding to update requests against the second objects, wherein (1) a set of input properties is stored with or associated with each replicated write-access object and (2) update logic specifying how to update each of the replicated write-access objects is stored with or associated with the replicated write-access object or a group of replicated write-access objects; receiving read requests against one or more of the first objects; receiving update requests against one or more of the second objects; responding to the read requests using the replicated read-access objects; queuing the update requests, along with the input properties and values thereof which are to be used for performing each update request, as queued update requests on an update queue; scheduling a refresh of a selected replicated read-access object by queuing the selected replicated read-access object or a reference thereto as a queued refresh request on a refresh queue; determining that a replication is to be performed; and performing the replication to refresh the replicated read-access objects and the replicated write-access objects by processing the queued refresh requests on the refresh queue and the queued update requests on the update queue.

A separate refresh queue and a separate update queue may be created for each of one or more back-end data sources to be accessed during the replication.

A first caching policy of the refresh queue may be set to refresh the replicated read-access objects upon making a connection to a first back-end data source and a second caching policy of the update queue may be set to perform the queued update requests on the update queue upon making the connection to the first back-end data source or upon making a connection to a second back-end data source. In this case, performing the replication is preferably triggered according to one or both of the first caching policy or the second caching policy.

The technique may further comprises connecting to one or more back-end data sources prior to performing the replication, and disconnecting from the one or more back-end data sources after performing the replication.

Performing the replication may further comprise executing the refresh logic stored with or associated with selected replicated read-access objects for which the queued refresh requests are queued, and executing the update logic stored with or associated with selected replication write-access objects for which the queued update requests are queued.

Or, performing the replication may further comprise processing the queued update requests on the update queue, and processing the queued refresh requests on the refresh queue, after processing the queued update requests. Processing the queued update requests further comprises further comprises: setting the input properties of a selected replicated write-access object against which the queued update request is to be performed using the queued input property values; and executing the update logic stored with or associated with the selected replicated write-access object using the input properties and values thereof. Processing the queued refresh requests further comprises executing the refresh logic stored with or associated with selected replicated read-access objects for which the queued refresh requests are queued, thereby refreshing the selected replicated read-access objects. Performing the replication may further comprise connecting to one or more back-end data sources prior to processing the queued update requests, and disconnecting from the one or more back-end data sources after processing the queued refresh requests.

Determining that the replication is to be performed may further comprise detecting that a connection to a back-end data source has been made.

Performing the replication may further comprise offloading the replication to a remote device. The offloading preferably further comprises: packaging the refresh queue and update queue for sending to the remote device; sending the packaged queues to the remote device; receiving a response from the remote device which indicates that the offloaded replication has been performed; refreshing the replicated read-access objects, responsive to receiving the response; and purging the refresh queue and update queue, responsive to the refreshing. The packaging may further comprise creating an Extensible Markup Language (XML) representation of the refresh queue and the update queue. The received response may comprise information to use during the refreshing, and this information may be in an XML representation. The offloading may further comprise connecting to the remote device prior to sending the packaged queues, and disconnecting from the remote device after receiving the response.

The present invention will now be described with reference to the following drawings, in which like reference numbers denote the same element throughout.

BRIEF DESCRIPTION OF THE DRAWINGS

FIGS. 3A–3B provide schematic illustrations of read access to cached objects and write access to cached objects, respectively, according to a first aspect of the present invention;

FIG. 6 provides a flowchart which sets forth a preferred embodiment of the logic which may be used to perform this synchronization process, according to the second aspect of the present invention.

DESCRIPTION OF THE PREFERRED EMBODIMENT

Figure 1:
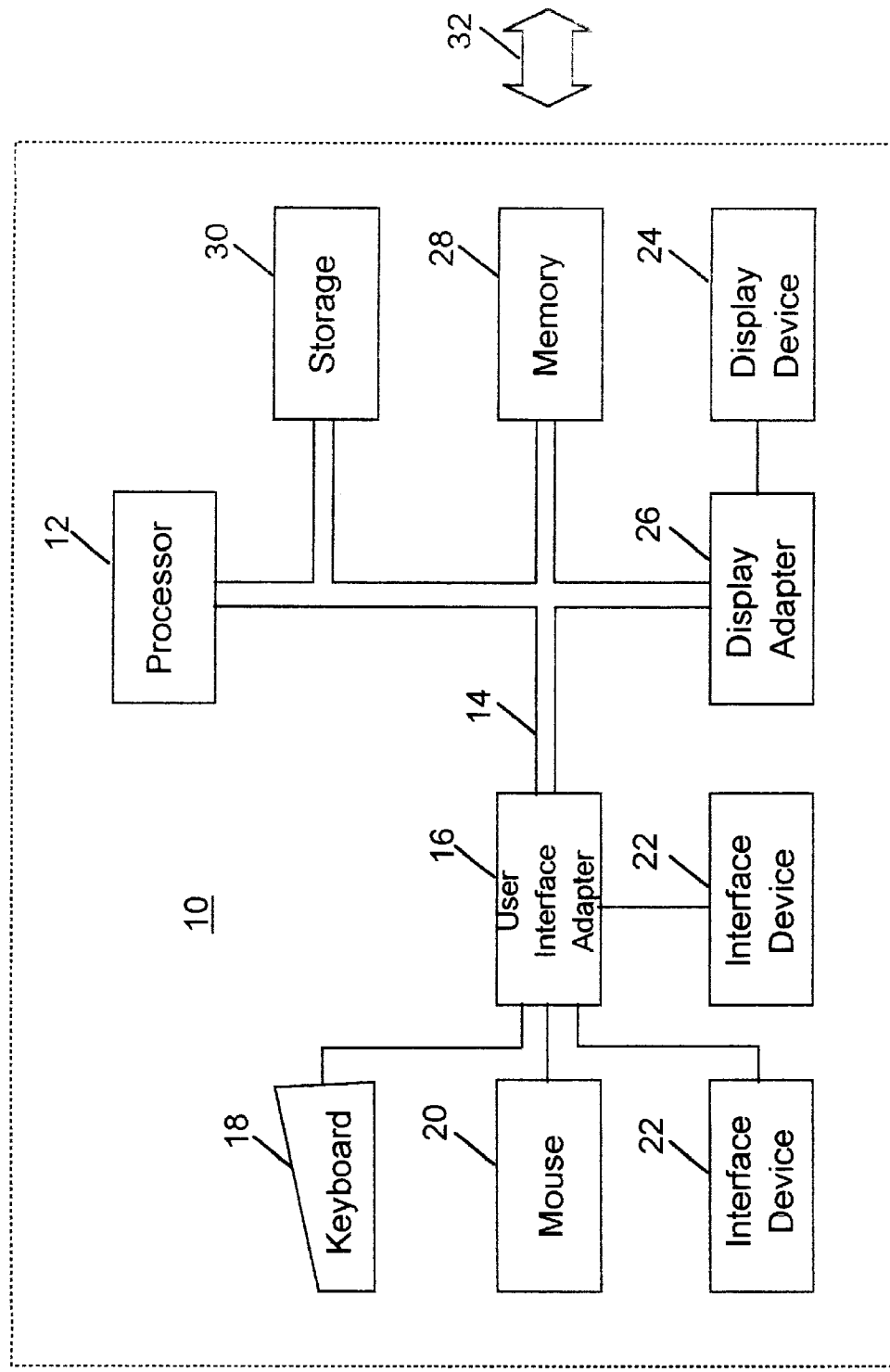
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a wide area network (WAN), or the workstation 10 can be a client in a client/server arrangement with another computer, etc. All of these configurations, as well as the appropriate communications hardware and software, are known in the art.

The hardware environment of a server is well known in the art. The present invention may operate between a workstation and a server, or between a server and another server, where these types of devices may be connected by a network.

Figure 2:
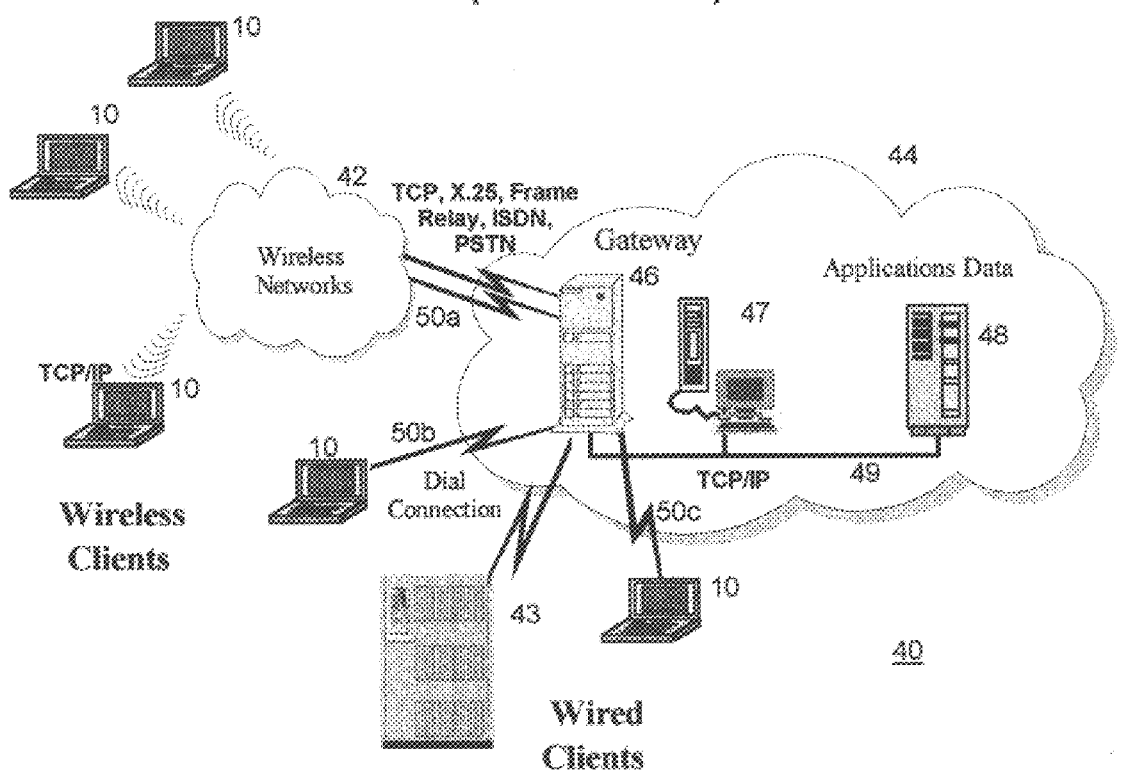
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.) These are merely representative types of computers with which the present invention may be used.

The gateway computer 46 may also be coupled 49 to a storage device (such as data repository 48). Further, the gateway 46 may be directly or indirectly coupled to one or more workstations 10, and servers such as gateway 46 and application server 47 may be coupled to other servers such as server 43.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the Workstations may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2. (Note that when the Host Publisher product is used to access legacy host data, the IBM Systems Network Architecture and its protocols are also used within the network. It will be obvious to one of skill in the art how the configuration shown in FIG. 2 is augmented for this situation.)

Software progranmuing code which embodies the present invention is typically accessed by the microprocessor 12 (for example, of the workstation 10, server 43, gateway 46, and/or server 47) from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The requesting and responding devices which make use of the present invention, when connected, may use a "wireline" connection or a "wireless" connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The requesting computer may be any type of computer processor, including laptop, handheld or mobile computers; vehicle-mounted devices; desktop computers; mainframe computers; etc., having processing and communication capabilities. The responding computer, similarly, can be one of any number of different types of computer which have processing and communication capabilities. These techniques are well known in the art, and the hardware devices and software which enable their use are readily available. (The requesting computer is referred to alternatively herein as the "requester" or "client" for ease of reference, although the requester may be a server machine operating as a client for a particular request/response scenario, and/or may alternatively be operating in a peer-to-peer or other network model. The responding computer is referred to alternatively herein as the "requester" or the "server", for ease of reference.)

In the preferred embodiment, the present invention is implemented in computer software. The implementation of the software of the present invention may operate as one or more modules (also referred to as code subroutines, or "objects" in object-oriented programming) on a client, server, or intermediary device in a network. Or, the software may execute on multiple devices in a distributed manner. An implementation of the present invention may be executing in a Web environment, where a Web server provides services in response to requests from a client connected through the Internet. Alternatively, an implementation of the present invention may be executing in a non-Web environment (using the Internet, a corporate intranet or extranet, or any other network). Configurations for the environment include a client/server network, as well as a peer-to-peer environment. These environments and configurations are well known in the art. References herein to client and server devices is not meant to limit the present invention to requests which originate with single-user client workstations. (As previously stated, the present invention may be used advantageously between two machines which typically function as servers.)

In a first aspect, the present invention provides an applicant-independent technique for improving performance and resource utilization by caching objects and queuing updates to enable delayed processing of back-end data store updates. In a second aspect, the present invention provides an application-independent technique for automatically synchronizing data between a replicated version and a back-end data store version which may or may not have the same format.

The preferred embodiment of these aspects of the present invention will now be discussed in more detail with reference to FIGS. 3 through 6.

The present invention uses a "cached objects" component (referred to equivalently herein as a "cache manager") which caches objects that are used by middleware applications to interact with back-end data sources, where the middleware application functions as a surrogate for a requesting client application. The cached objects component provides for storing, and for automatically refreshing, these objects. An example of a middleware application is IBM's Host Publisher software product, which may be invoked in response to receiving a user request for retrieving Web content or updating stored data, where that content retrieval or data update may require invoking a legacy host application or accessing a relational database. The data extracted using the legacy application or relational database may then be used to populate the properties of a JavaBean, which may subsequently be used (for example) to generate dynamic Web page content to be returned to a requester. In this example, the cached object is the populated JavaBean. (For purposes of describing the preferred embodiment, the cached information is discussed herein as being stored in JavaBeans, although other formats—such as objects in object-oriented languages other than Java—may be used alternatively without deviating from the scope of the present invention.) When accessing the legacy application or relational database to perform an update, the values to be used in the update process (along with operations that are required to initiate the update process, and optionally to interact with that process) are cached as an object, such as a JavaBean which is created as a Host Publisher IntegrationObject. (Note that the present invention may also be used advantageously in an environment where a middleware application of the type described is not in use, i.e. where an application on the client device will interact directly with the back-end application, and where the objects as described herein may be executed and/or cached on a client device.)

Each object stored by the cached objects component has a set of input properties and a set of output properties (which might not be set when the object is cached) representing the information to and from the object's corresponding back-end data source. Further, each cached object preferably includes processing logic which describes how the object interacts with the back-end data source, and an execution method which invokes this processing logic. The input properties and values thereof are used as an index to locate objects stored in the cached objects component, where those stored objects may be categorized as either read-access (RA) or write-access (WA). The technique described in the first related application, whereby the input property names are sorted, and the corresponding value of each property is then concatenated along with some type of separator, is preferably used for creating the index values used with the present invention for object caching and object lookup.

The processing logic of a bean may be specified as one or more object-oriented methods, or as a script or macro which interacts with a back-end application. The latter approach is used for the preferred embodiment of the present invention. Preferably, the processing logic of the bean is captured and recorded as a script using an automated navigation tool such as the macro function in IBM's Host On-Demand product. (Alternatively, a script may be created manually using, for example, a simple text editor.) The script as contemplated by the present invention represents an entire flow of execution for a particular task.

As an example of a RA object, suppose beans have been created for a book catalog application. A particular bean instance might include, as input properties, the category names or book titles to use in retrieving available book inventory information. The bean's script may then cause property values such as these to be used to perform a database lookup operation, where the results of the lookup are used to populate the bean's output properties. As an example of a WA object, beans may have been created for a book ordering application. In this case, the ordering customer's name and address, as well as a list of book names and quantities this customer wishes to order, are used as input properties. When the bean's script is executed, the back-end software application executes to place an order for the requested books. The output properties which are populated as a result may include such information as the total cost of the order and a target shipping date.

The following pseudo-script provides a high-level example of script processing, where a purchase order is being submitted to a host application. A script such as this may be used by a WA bean that is designed to handle submitted orders.

```
Login to host;
Start purchase order application;
Enter purchase order information;          note, transaction not yet committed
Simulate user entry of "F4" to submit information;
                                           action implies commit of entered order
View summary screen;                       commit point defined here;
                                           only reached if update successful
End purchase order application;
Logoff from host.
```

This example script processing is to be invoked when a WA bean having this processing logic is executed.

It should be noted that although the example script is based on screen interactions, the scripts can be constructed for data format exchanged applications as well. For instance, interactions with socket based or CPI-C based applications can be described via scripts. (While the examples discussed herein often refer to screen-based back-end applications, this is for purposes of illustration and not of limitation: the techniques disclosed herein may be used advantageously with many other types of applications, including database systems, CICS applications, etc.)

The scripts which are recorded and stored in a bean instance are executed by a macro or script execution engine, which understands the macro script language and runs through the instructions which have been specified. When interacting with a screen-based back-end application, the script execution typically repeats a pattern of recognizing (i.e. detecting) a screen to take an action, and then waiting for the next screen, as defined by the script. In the preferred embodiment, a macro execution engine such as that provided by IBM's Host On-Demand product is used.

Zero or more error scripts may also be defined and stored as methods of a bean class, where those methods may be inherited by a bean instance to be cached. Each error script is preferably defined to be invoked in response to detecting a particular error condition as a script executes and, for example, a screen or event is not recognized according to the specifications of the script. Upon detecting an error, the macro execution engine causes the appropriate error script to execute. Examples of errors include: the back-end system is down and not responding; the requested application is not available; errors are detected in the input parameter values; etc. Some types of errors, such as errors in the input values, may be recoverable. For example, if the user's password is entered incorrectly during execution of a log-on script, the user can be prompted to try again. In other cases, such as the application being unavailable, execution of the script should be suspended and retried at another time. (A rescheduling action is taken by the present invention in this latter case, as will be described in more detail below.) Preferably, an error processing script will reset the back-end system to the same initial state for which the object's script has been written, such that the script can then be re-executed. The Intergration Objects provided by IBM's Host Publisher product provide this type of error recovery processing. Error processing will be described in more detail below.

For WA beans, the script may contain an indication of a "commit point". In the example depicted above, the intermediate commit point occurs when the summary screen is displayed. This commit point is defined by the bean developer, and represents a point in a transactional approach to updating the back-end data store where an interim steady state has been reached. Preferably, each script used for update processing contains a single commit point. (The semantics of a particular application, however, will determine whether use of a commit point is advisable, as well as where the commit point should be placed.) The commit point may correspond, as an example, to a point in a script where a user has theoretically pressed a "Save" or "End" key. The cache manager uses the commit points, along with error processing, to ensure successful execution of a write-cached bean. If the commit point in the script processing is reached, then the update processing has been successful. If not, then the cache manager preferably re-executes the bean. Note that the commit point may be expressed either within the script (embedded within the scripting language), as in this example, or it may be specified externally as meta-data.

In the preferred embodiment, scripts are expressed in the Extensible Markup Language ("XML"). A simple example of a host interaction script is attached hereto in Appendix A. (Appendix A is hereby incorporated herein by reference.) This script begins by prompting a user for his or her identification and password; simulates the user pressing the Enter key, and clears the screen; selects a legacy host application to be accessed; navigates among various host screens to obtain a menu and submenu selection; simulates the user pressing a Quit or End key; and then logs off. Each logical block in the script describes part of the host interaction flow, and reflects the host's current state, the input action against that state, and the output extraction, as well as the next set of states expected in response to the input action. A particular block can be marked as the commit point for an interaction sequence.

An object to be cached needs to register itself with the cached objects component first, in order to let the cached object component know that an object is cached and specify the object's cache policy, etc. According to the preferred embodiment, the bean developer is not required to provide an application-specific registration method. Instead, a registration method is preferably provided along with an implementation of the present invention, where this method may then be inherited by bean instances. Cached beans can be registered in several alternative ways, including:

1) Explicit link: In this approach, the cache manager is itself created as a bean. Individual beans are added to the cache manager (for example, by accessing a method of the cache manager which is provided by an implementation of the present invention, such as "addBeanToCache"). The cached objects component therefore inherently knows which beans are cached. The cache manager may create an object registration database in this process, providing an identification of each cached object as an entry in the registration database such that the cache manager can then read this registration database to determine the names of the cached objects. Read and write methods of the cache manager are used by application programs to request actions from cached beans. Provided a bean follows the above-described model of input and output properties, and an execution method which invokes a script or macro, the bean may be used in this explicit link approach without further modification.

2) Implicit link: In this approach, the bean developer writes beans that derive from a base implementation which is provided by the present invention, where the base implementation implicitly points to a cache manager. The cache manager is an internal object known only to the beans. When an application program requests an action from a bean, the request is automatically linked to the cache manager for satisfying the request. This approach requires that the beans are implemented in accordance with the provided interface to the base implementation.

3) Preprocessor wrapper: An automated process may be created for generating wrappers for beans. The wrapper then provides the common methods (i.e. set and get methods for input and output properties, and an execution method to invoke the bean's processing logic) for the beans to be cached, where these common methods are coded such that they map to the specific properties and methods of each wrapped bean. This approach extends the range of beans which are eligible for caching, as the bean developer does not have to manually provide any cache-aware code.

FIRST ASPECT OF THE PRESENT INVENTION

The cache manager caches RA objects in a data repository (i.e. a cache) which may be internal to the cache manager, or which is otherwise accessible thereto. When an application requests access a cached bean, the access may be either RA or WA. If the request by a client application is for a RA object, this request is satisfied from the cache store without accessing the back-end data source, provided that a cached object exists which can satisfy the request. Each cached object preferably includes a cache policy, which is preferably specified by the developer as a method of each bean instance. (Alternatively, the cache policy may be specified on a per-lass basis, with each bean instance inheriting the method of its associated class. Cache policy may be specified as a class or instance variable, instead of as a method, provided that a method of the cache manager is properly adapted to processing the variable's value. This latter approach may be used, for example, if all cache policy values are to be interpreted as a time-of-day value.) If desired in a particular implementation of either or both aspects of the present invention, an administrative interface may be provided to enable the caching policy and/or update mode selection, to be described below, to be explicitly set (e.g. as configuration parameter values).

The caching policy of an RA object preferably specifies when the object is to be periodically refreshed. For example, an object may be refreshed at a particular time of day; upon occurrence of a specified event; upon an elapsed time since the last refresh; etc. This refresh process thereby ensures that a relatively up-to-date version of the back-end data is being used when responding to client read requests. Furthermore, the present invention may be used to specify that a refresh operation for an RA object is to be triggered when a related WA object is executed. As an example, suppose an RA object containing book price information has been cached. It may be desirable to refresh this RA object when a WA object for updating book inventories is executed, perhaps indicating that new books have been received into inventory at a different price. By specifying a refresh policy for RA objects using their interactions with WA objects, overall system performance can be improved by refreshing RA objects only when it is likely that new information will be retrieved from the back-end data source.

FIG. 3A illustrates the flow of how a read request is accommodated using the cached objects component 305. As previously stated, an object such as HAO1 311 or HAO2 312 first registers itself with the cache manager 305. An initial version of the object's output properties is created when a registered object operates to establish a connection to its backend data source, where content is then retrieved or generated and is used to populate the object's output properties. The populated object is then stored in the cache 300, using its input properties as an index to determine the particular storage location where the object will be stored within the cache. This object population and cache store operation preferably occurs the first time a particular object is accessed, as well as upon subsequent accesses where the cached content is determined to be invalid or otherwise in need of refreshing, according to the object's caching policy. (FIG. 3A depicts the cache 300 as being internal to the cached objects component 305, and as using a tabular approach for storing particular objects in locations corresponding to an index value, however, this is for purposes of illustration and not of limitation.)

As an example of performing a read access using cached objects component 305, suppose application 315 issues a read request 301 for an object 310 which is needed by the application. If the object has already been populated and stored in the cache 300, as shown by the cached copy 311, then the cache manager first determines whether it has a cached copy of the requested object by creating a cache index value using the object's name and input property names and values. (As described in the first related invention, an object's input property names and values are used as a cache index value to ensure retrieval of output data values which may change based on differences in the input property values.) Upon locating a matching cached object, the object's caching policy is then evaluated to determine if this cached copy has become stale or otherwise invalid. If the cached copy is determined to be still usable, this copy is used to respond 302 to the application's request. If a requested object is not yet available in the cache 300, or the caching policy determines that a previously-cached version has become invalid (for example, due to exceeding an object's life-span as reflected by its caching policy), then the cached copy is refreshed (or obtained, when the object has not yet been cached): For example, cached object HAO2 shown at 312 is refreshed by executing the retrieval logic in the execution script of the cached object. This retrieval logic causes a request to be sent 303 to the back-end data source at host 320, which returns 304 a fresh copy of data values to be used for refreshing the cached object (i.e. re-populating the object's output properties) in the cache 300. Whether a cached copy is already cached or a fresh copy must be retrieved is transparent to the requesting application, which operates as though an actual access (shown in FIG. 3A as imaginary access 325) had been made directly to the back-end data source and a copy had been retrieved in real time.

In an optional feature of this aspect, the refresh policy of each cached object may be periodically evaluated (e.g. at periodic time intervals, or in response to predetermined events) to determine whether the associated cached objects have become invalid. When this technique is used, RA objects which are determined to be invalid may be immediately refreshed by executing their stored execution scripts. Alternatively, the refresh operation may be scheduled by placing an element identifying the object to be refreshed on a queue. This queue may then be processed in response to occurrence of an event, including reaching a particular time of day when a system is lightly loaded. Individual refresh queues may be created, where the elements on each queue use the same triggering refresh event. Or, a separate queue can be used for each distinct back-end data source that is to be accessed, where a particular queue then includes refresh requests for multiple objects using that data source. Other criteria for structuring queues may be used as well, including use of a single queue. Each element on the queue is processed by executing the associated object's script, and then removing the element from the queue.

Figure 3B:
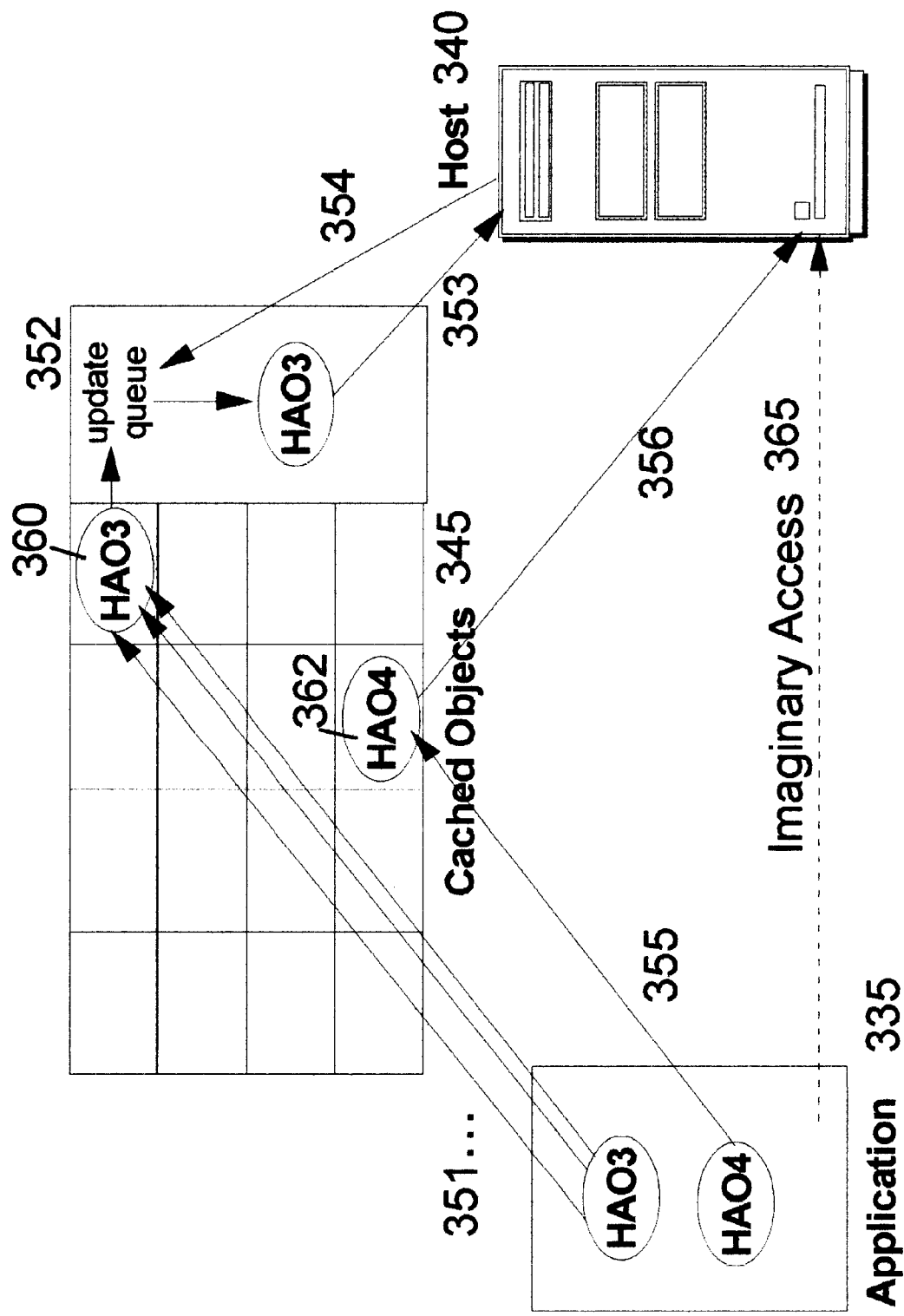

A request to a WA object results in the back-end data source being updated in one of three possible modes: (1) a synchronous update; (2) an asynchronous update; or (3) a queued disconnected update, which may be referred to equivalently as a delayed update. FIG. 3B illustrates examples of the flows of this update process. As an application 335 executes, it requests some number of updates (shown as "351 . . . ") to a particular object, which in the example of FIG. 3B is HAO3 (element 360). If application 335 is operating in disconnected mode, then these updates cannot be processed against the back-end data source in real-time. Rather, the updates must be accumulated and applied to the back-end data source at some later time. In the branch office scenario, for example, the branch's daily work may be accumulated for transmission to the back-end enterprise system for processing after the branch closes for the day. Or, in the mobile computing scenario, the requests may be accumulated for subsequent transmission when the mobile devices connects to a server. After transmission, the mobile device may then disconnect (to reduce connection costs, for example), and will receive the server's responses during some (arbitrarily-timed) subsequent connection. This queued disconnected mode is preferably used for the branch office and mobile computing scenario, and may be used for other scenarios as well: application-specific criteria may be used to determine which update mode to use.

According to the preferred embodiment, the update mode may vary among the objects of a particular application, and may also vary over time for a particular object. Preferably, each cached object includes information which can be interrogated by the cache manager when an update is requested. The cache manager then uses the result to determine which update mode to use. For example, a cached object may include a method that obtains the current time of day, and based on this result, specifies whether delayed or immediate processing is to be used. In a particular system, the update mode may be set such that delayed updates are selected between the hours of 8 a.m. and 5 p.m. because the system is heavily used in that timeframe, as an example, while updates which are requested between midnight and 8 a.m. use the synchronous immediate mode and those requested between 5 p.m. and midnight use the asynchronous immediate mode. Or, more complex evaluations may be performed such as counting the number of updates requested within a particular time period, and altering the update mode accordingly in order to reduce network traffic. Furthermore, user-specific criteria may be used to determine the update mode. As an example, application users in an enterprise may be divided into classifications which reflect different update processing priorities, such that updates requested by some users are immediately processed using the synchronous immediate mode; updates requested by other users are immediately processed using the asynchronous immediate mode; and updates requested by users in one or more low-priority classifications are processed in delayed mode.

Updates which are to be processed using the delayed (i.e. queued disconnected) mode are accumulated, according to the first aspect of the present invention, by queuing those updates on a write queue or update queue 352. The updates from the queue are then processed subsequently, in a delayed manner from the actual update request. (Preferably, an update queue is treated as logically separate from the cache 300 used for RA objects, which was described above. This separation enables the RA objects to potentially be refreshed more often, without regard to the policy for scheduling execution of the WA objects from the update queue(s), thereby enabling RA objects to reflect more recent versions of the back-end data source.)

In the preferred embodiment, a logically separate update queue is created for each cached WA object. (Alternatively, a single queue can be used, provided that queue processing logic is adapted accordingly. It will be obvious to one of ordinary skill in the art how this alternative process can be implemented, for example by searching through the queue to find elements queued for a particular object, rather than merely processing all queued elements in sequence. Or, a separate queue can be used for each distinct back-end data source that is to be accessed.) Each cached WA object has a caching policy which indicates when the queued updates are to be processed, in a similar manner to that described above for the refreshing of RA objects. For each update operation that is to be queued, an element is preferably added to a FIFO (First-In, First-Out) queue for that particular object. Each such element preferably specifies a set of input property values that are to be used in the update operation. For example, if a book ordering object is to be processed in a delayed manner, then each order submitted that is to use this object may be queued as a separate element where the input property values may include a set of book titles (or equivalently, book numbers) and order quantities. Or, if a book ordering application is written such that its objects correspond to individual books, then an update queue may be created for each book, where the queued elements include the number of that book to be ordered for a particular customer. In the preferred embodiment, queued elements are specified using XML syntax.

To ensure process integrity, in the preferred embodiment an instance of a WA object is put on the update queue 352 only after the object's input property values have been validated. That is, update objects which can be determined in advance to have input property values which will cause an error condition are not queued; instead, an error is returned immediately to the application. This is preferably implemented by including input property validation methods in each bean class, to be inherited by their bean instances, where execution of the validation method(s) is triggered upon a write request against the instance.

When the update policy of an object having elements queued in its update queue 352 is triggered (for example, reaching a certain time of day when low-priority batched mode requests are to be processed), the updates from the queue 352 are processed by executing the update script of the corresponding object. This execution causes the object's update operation to be applied 353 to the back-end data source at host 340, by execution of the object's script using the input property values from the queued element. If the object reaches its commit point or otherwise successfully completes the update process (i.e. does not encounter an unrecoverable error during script execution), then the queued update is removed 354 from the update queue 342. Once all queued elements have been processed for an object, the output property values of the cached WA object and/or a corresponding RA object may optionally be re-populated to reflect the current version of the object at the back-end data store.

The logic which may be used to implement the process by which a queued update occurs, according to a preferred embodiment of the first aspect of the present invention, will now be described with reference to FIG. 4. This process is preferably invoked each time an update event occurs, where the update event may include such things as reaching a certain time of day (for example, when updates are delayed until a time when the system is lightly loaded, as has been discussed); expiration of a wait timer; receiving a notification in the cache manager that a connection for a mobile device has been made; etc. A triggering event may be specified in terms of a related RA object as well. For example, a count may be accumulated of the number of times a particular RA object is accessed within a particular time period. Exceeding an object-specific threshold value may indicate that the RA object is being used more heavily than normal, in which case it may be desirable to perform any updates which may be queued for an associated WA object. As will be obvious, the needs of a particular application will dictate how the update events (and the refreshes of RA objects) should be triggered.

The processing of the queued updates begins by instantiating the object to which the queued element on the update queue corresponds (Block 400), and making a connection from the device on which the cache manager is executing to the back-end data source (Block 405).

Blocks 410 through 440 then iteratively process the update elements on the queue. The current queue element is obtained at Block 410. A FIFO queue is preferably used, so that the updates will be processed in the same order in which they were placed onto the update queue. The input property values which are stored in the current element are used (Block 415) to set the input properties of the object which was instantiated at Block 400. The instantiated object's script is then executed (Block 420), causing the back-end data store to be updated accordingly. Block 425 checks to see if an error was encountered during this processing. Occurrence of an error is detected by the macro engine, as previously described. If there was an error, then control transfers to Block 430 which attempts to recover the object using an error-specific recovery script from the object, also as previously described. As has been stated, an object's update script should start and end at the same back-end state, in order to make the update process easily repeatable in case of failure. After the recovery process finishes, control returns to Block 420 to re-execute the update script.

When an object's script is re-executed by returning to Block 420 and an error condition persists, the processing preferably skips to the next element on the queue. This may be implemented by using a retry-flag or counter (not shown in FIG. 4). When the elements on a queue have been completely processed using the logic in FIG. 4 and this skipping of queued elements for repeating error conditions, occurrence of non-recoverable errors will result in a non-empty queue. In the preferred embodiment, this situation requires manual intervention to correct the associated problem. For example, an administrative interface may be provided to enable a systems administrator to address particular error conditions. Typically, non-recoverable errors will be system and application errors such as temporary or permanent unavailability of a back-end component. When errors are encountered that cannot be avoided at the present time, the updates remaining on the update queue may be suspended such that they will be scheduled for execution at a subsequent time, or they may be purged as part of the intervention process, as required by a particular implementation of the present invention.

Otherwise, when there was no error detected by Block 425, Block 435 removes the element from the queue, and Block 440 then checks to see if there are any more elements on the update queue for this object. If there are, control returns to Block 410 to get the next queued element and begin its processing; otherwise, updates for this object are finished, so the connection to the back-end data source may be disconnected (Block 445), and the queued update processing of FIG. 4 then ends.

Alternatively, an implementation may optimize the update process by maintaining an ongoing connection to the back-end data source, in which case the function of Blocks 405 and 445 is not performed for each individual update operation.

Returning to FIG. 3B, when updates for a particular object are not delayed (i.e. when updates are processed immediately, using either the synchronous immediate mode or the asynchronous immediate mode which were described above), then updates are not put on an update queue 352 for this object. This is illustrated by update request 355 for object HAO4 362, which is sent by application 335 to the cached objects component 345. (Note that cached object component 345 in FIG. 3B may be considered identical to cached objects component 305 of FIG. 3A, except for addition of the object update queue 352 and interpretation of the cached objects as WA objects instead of RA objects.) In this example, the cache manager determines that update request 355 is to be processed as an asynchronous immediate update—that is, application 335 will not wait for the update processing 356 to complete before continuing on to other application tasks. Therefore, the cached objects component 345 causes execution of the object HAO4's update script upon receiving the update request 355. As the update script executes, the interactions 356 with the back-end data source 340 cause the back-end data store to be updated. The flow of processing a synchronous immediate update is similar, except that the cache manager does not return control to the application 335 until the update operation 356 to the back-end data source at host 340 has completed. Note that in the preferred embodiment of this first aspect, the application program 335 always calls the same write or update method, making the particular type of update which is performed transparent to the application: the update policy for a particular cached object upon which the update is to be performed determines whether the update is performed immediately (and whether that immediate update is synchronous or asynchronous), or whether the update is put onto an update queue 352. From the application's point of view, the update occurs as if imaginary access 365 takes place directly between the application 335 and the back-end data source 340. When the explicit link approach described above is used, the WA request uses a method of the cache manager and specifies an identifier of the appropriate object. When the implicit link or wrapper approach is used, the WA request uses a method of the particular cached object for which the update is requested. Alternatively, applications can set the specific update modes in real time via additional property manipulations.

Figure 4:
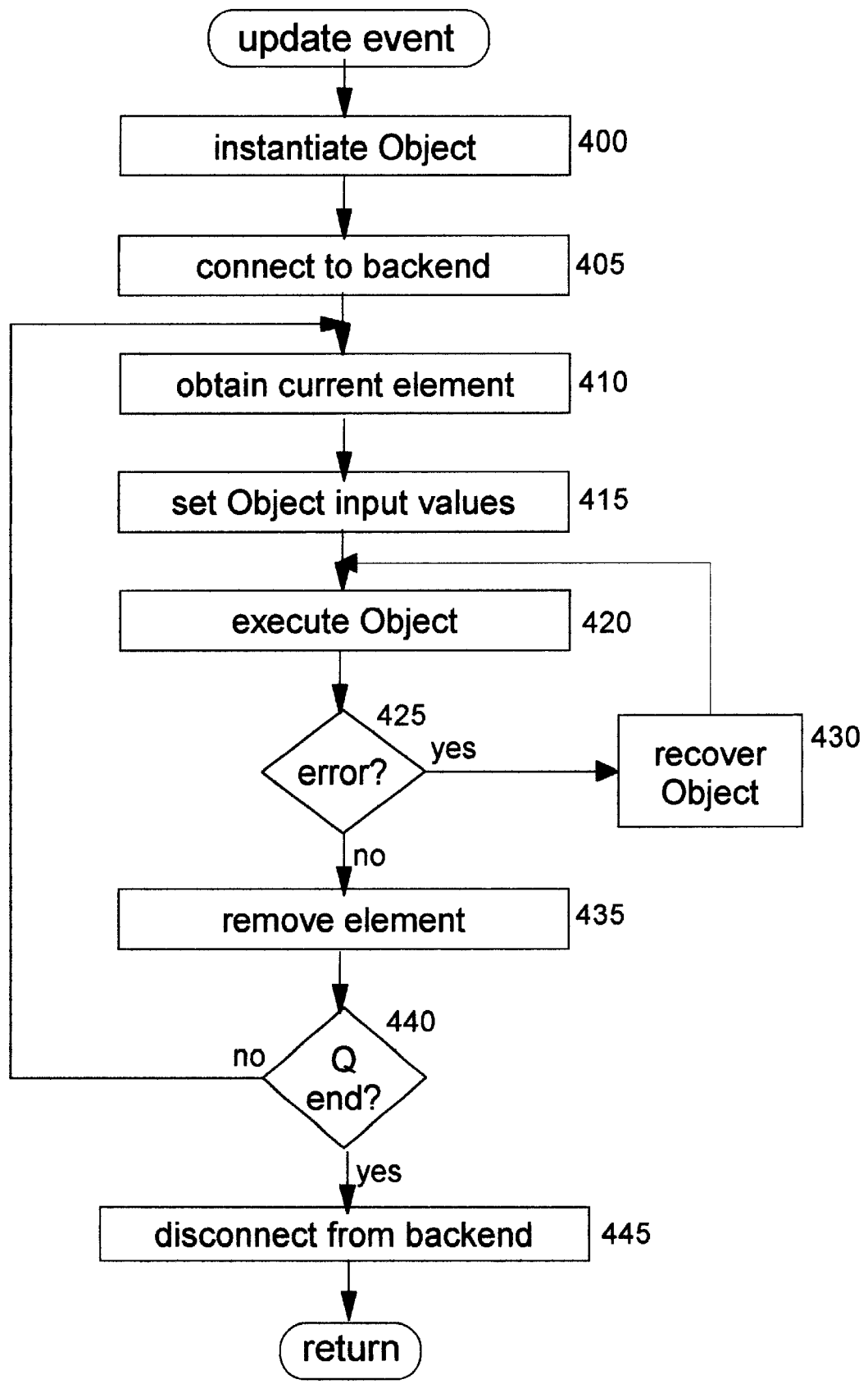
FIG. 4 provides a flowchart which sets forth the logic which may be used to process queued updates to a cached object, and similarly a refresh of a cached object, according to a preferred embodiment of the first aspect of the present invention.

As will be obvious, the logic which may be used to implement the processing of immediate updates is a subset of the logic shown in FIG. 4. In particular, the triggering update event is the update request which the application sends to the cached objects component, and this update process instantiates (Block 400) the object (such as cached WA object HAO4, shown as element 362 in FIG. 3B); may make a connection to the back-end data source (Block 405); sets the object's input values with information obtained from the update request (Block 415); executes the object's update script (Block 420); attempts a recovery, if the update process did not complete successfully (Blocks 425 and 430); and then may disconnect (Block 445) from the back-end data source.

The manner in which elements on a refresh queue are processed is analogous to the process depicted in FIG. 4, with minor variations that will be obvious to one of skill in the art. (For example, a refresh script will not typically include a commit point, and the script execution at Block 420 causes a retrieval of information from the back-end data store rather than an updating.)

Note that access to the back-end data source while processing reads and writes may need to be serialized. For example, a book ordering object may access the same inventory database used by a book catalog object. The application which processes book-related tasks at the back-end system may need to enforce an application-specific ordering among the accesses. This serialization is assumed to use prior art mechanisms which exist at the back-end system, and which do not form part of the present invention.

As has been demonstrated, the first aspect of the present invention provides a novel technique for performing reads and writes to a back-end data source by caching quasi-static data for reads, and by creating and processing update queues for writes which are to occur in a delayed mode. The cached read access and write access objects cache the object which is to be affected, including values used for its input properties. The cached object also includes the program or script which is to be executed when performing a refresh (for a RA object) or an update (for a WA object). For applications which are adaptable to this technique, this aspect of the present invention enables better resource utilization to occur by avoiding unnecessary reads to a back-end data source and by enabling writes to be scheduled for processing when particular events occur or when particular system-specific conditions are met. Read refreshes may be scheduled based on a number of factors as well, such as occurrence of an event (including execution of a WA object). In addition, a simpler programming model results through use of this aspect, because a developer does not have to manually code (inter alia) the details of the delayed processing. This simpler programming model enables reducing the development, maintenance, and administrative burden on an enterprise.

SECOND ASPECT OF THE INVENTION

In a second aspect of the present invention, an application-independent technique is provided for automatically synchronizing data between a replicated version to be accessed by a client device and a back-end data store version, where the two versions may or may not use the same format for data storage. As stated earlier, a dissimilar format is likely to exist when the back-end data source is a legacy host application or database access program, and the client software uses modern object-oriented data storage formats. In addition, this technique is particularly advantageous for use with mobile computing devices, where a replicated version of the data is stored locally on the mobile device for use while the device does not have a network connection, and for use in environments such as that which has been referred to herein as a "branch office" setting wherein a local server has a replicated version of data which is also stored on a back-end data store (as a "master" copy). In these cases, it is necessary to periodically synchronize the replicated data with the back-end data store. Other environments which operate with replicated data may also find this technique advantageous.

Figure 5:
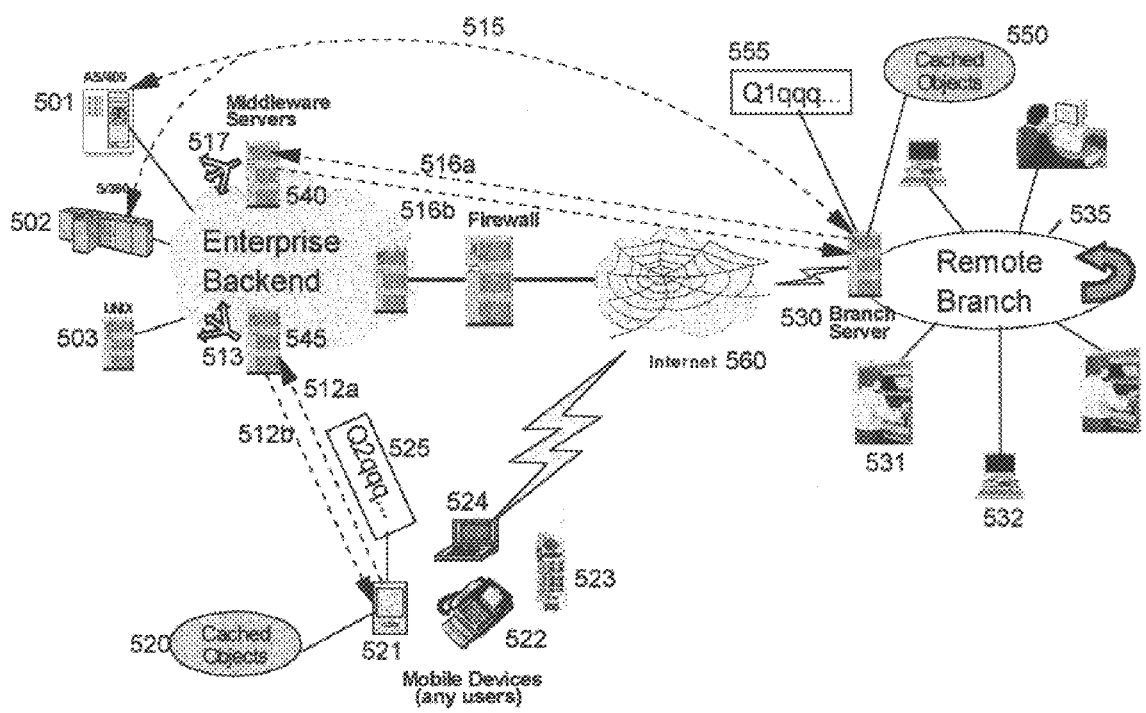
FIG. 5 provides a schematic illustration of the process used to synchronize data between two data stores when updates are performed to a replicated data store in a disconnected operation mode, according to a second aspect of the present invention.

FIG. 5 depicts a schematic illustration of the mobile computing and branch office environments, and the flow of messages which is used for this data synchronization aspect. In this second aspect, the cached objects component preferably exists on the mobile device (see element 520) or at the branch office server (see element 550), as appropriate. The client devices in both situations are considered herein as operating in disconnected mode, as they are not (necessarily) connected to the back-end data store where the master copy of the data resides. In the mobile computing environment, the client device may be a personal digital assistant (PDA) 521, screen phone 522, cell phone 523, laptop 524, etc., which has computing and networking capabilities. (Alternatively, in a device which does not have networking capabilities, the features of the present invention may be used by storing cached objects on a storage medium, such as a diskette, from which the objects can be offloaded to another machine such as server 530 or 545 for processing.) In the branch office environment, the server 530 at the branch office acts as a surrogate for the actual client devices 531, 532, etc. which are connected to that server 530 (using a LAN 535, for example, as shown in FIG. 5, or using another network type). The disconnected client or its surrogate creates and registers objects to a cached objects component 520 or 540 in the manner described previously for the first aspect, where the cached objects component of this second aspect will provide the data synchronization in an application-independent manner. The caching policy used in this aspect is preferably set to convey the semantics of "refresh upon connection" and "queued update upon connection" for RA and WA objects, respectively. Read requests at a client device are satisfied by accessing a RA object which has been cached as a replicated version of the master copy, in the manner described above for the first aspect. Update requests used in this second aspect are collected in an update queue which is (preferably) object-specific, as also described above for the queued disconnected update mode of the first aspect. Preferably, the surrogate device implements a client/server interface for exchanging requests and responses with its subordinate client devices. That is, the client requests an object access, and the surrogate provides a response thereto.

When the surrogate or mobile device becomes connected, the queued updates—as well as any RA object refreshes that are pending on a refresh queue—may be (1) offloaded to a remote machine for processing or (2) processed from the local machine.

The first case is depicted in flows 512a, 513, 512b, where the queued requests 525 are transmitted to the remote machine 545 (which may be a middleware server in an enterprise computing environment) in flow 512a. This remote machine 545 then interacts 513 with a back-end system such as 501, 502, 503 to complete the request, and then sends 512b the processing results as a response to the cached objects component 520 on the mobile device. The replicated data at the client device is then re-populated accordingly. Flows 516a and 516b depict a similar offloading of queued requests 555 from a surrogate machine 530, where the receiver 540 then interacts 517 with the appropriate back-end device to perform the refresh or update processing. Note that the state of an object is preferably offloaded as well in this remote processing approach. That is, the set of input and output properties stored with the object, together with the connection/disconnection properties related to the back-end system, is offloaded to the remote system. This information may, for example, take the form of the request parcel documents which are described in the related invention titled "Self-Propagating Software Objects and Applications" (referred to herein as the "second related invention"), depicted in FIG. 5 therein. When the parcel technique is used, the parcel may include elements to specify how to retrieve an object(s) or processing code that is required for the offloaded work request, in case the objects (s) or code is not already available on the site which is the target of the offloading operation.

The second case is depicted as flow 515, where the requests and responses occur between the surrogate device 530 and an appropriate back-end device 501, 502, etc., as needed for a particular processing request. (As will be obvious, the message flows indicated in FIG. 5 occur using a network such as the Internet 560; the flows are shown as occurring directly between the source and destination devices for illustrative purposes only.) In either approach, the processing of the queues comprises executing the scripts of the objects referenced in the refresh queue and the update queue(s). The refreshing and queued updating may be invoked using a timer-driven means, or other event-driven approach, as was discussed above with reference to processing refreshes and delayed updates in the first aspect.

The logic with which this data synchronization process occurs, according to a preferred embodiment of the second aspect of the present invention, will now be described with reference to FIG. 6. When the synchronization is initiated, an identification of the objects which are to be refreshed is obtained (Block 600). Preferably, a clone or copy of a RA object, or a pointer or similar reference thereto, is appended to a FIFO queue when that object's refresh event is queued. The queue or queues of objects which are scheduled for updating is also obtained (Block 605). As was described with reference to the first aspect, a single update queue may be used for all WA objects, or a separate queue may be created for each distinct object for which update operations are needed. A determination is made as to whether the refresh and update processing is to be offloaded (Block 610). If the result is positive, control transfers to Block 635 where the queues are packaged together for transmission to another device. This packaging may be done in a number of ways, such as serializing the objects to an output file. As stated above, the packaging may comprise creating parcels of the type described in the second related invention. The particular manner in which the packaging occurs may vary without deviating from the scope of the present invention: what is required is that the packaging is performed such that the receiving device is adapted to perform a corresponding unpackaging operation prior to starting the processing of the offloaded work. Upon receipt at the receiving device, the processing preferably occurs as depicted in Blocks 600, 605, and 615 through 630.

If the result from Block 610 is negative, then the processing is to be performed locally, and control therefore transfers to Block 615 where a connection to the back-end data source is made. The update and refresh queues are then processed (Blocks 620 and 625), and then the back-end connection is released (Block 630). Note that the update queue is preferably processed prior to the refresh queue, so that the refreshed versions of the RA objects reflect any updates which have been made. The manner in which the queue processing occurs is analogous to that described above for the first aspect (a preferred embodiment of which is illustrated in FIG. 4).

When the queues are being offloaded to a remote device for processing, the local device connects to that remote device (Block 640) after the queues have been packaged (Block 635), and then sends (Block 645) the packaged work to that remote device. When the remote processing completes, the local device is notified (Block 650). This notification may include data to use in refreshing (i.e. re-populating) the RA and WA objects in the cache. If a parcel service is used, as described in the second related invention, then the notification may comprise response parcels of the type disclosed therein. Alternatively, it may comprise simply a notification that the local cached objects component should now initiate a retrieval of information for refreshing those objects. In any case, the refresh operation occurs (Block 655), and the connection to the remote device is terminated (Block 660). When the Block 650 notification requires the local device to initiate a separate information retrieval process, the local device may either connect to the back-end data store for this retrieval, or may retrieve the information from the remote device itself (e.g. middleware server 540 or 545) if this remote device has its own replicated version of the back-end data. The remote processing which occurs following Block 645 and preceding Block 650 comprises execution of Blocks 600 and 605, followed by Blocks 615–630. (Optionally, the full logic of FIG. 6 may be implemented at a remote machine, to enable this remote machine to offload processing requests to yet another remote machine.) As has been described above for the local processing in this second aspect, the actual queue processing which occurs at the remote machine in Blocks 620 and 625 is preferably analogous to that discussed with reference to the first aspect.

A particular implementation of this second aspect of the present invention may choose to omit the choice between local processing and remote processing. In that situation, the logic to perform the determination in Block 610 is preferably omitted, and only one of (1) Blocks 615 through 630 or (2) Blocks 635 through 660 is implemented, as appropriate.

The technique of this second aspect enables efficient synchronization of data sources for devices which may only be connected periodically, without requiring that special application-specific logic (which accounts for the format of each of the application's objects, for example) be implemented to perform the synchronization, and without requiring that the data format on the two devices is identical. The optional offloading technique enables minimizing connection time and costs for performing the synchronization, which is particularly beneficial for mobile computing devices.

While the preferred embodiment of the present invention has been described, additional variations and modifications in that embodiment may occur to those skilled in the art once they learn of the basic inventive concepts. For example, the techniques disclosed herein are based partially upon certain predefined characteristics of the JavaBeans which are used for the preferred embodiment. It will be obvious to one of ordinary skill in the art that the inventive concepts disclosed herein may be adapted to changes in these characteristics, should they occur. The inventive concepts may also be used with other processing models. Furthermore, queue structures have been used in the preferred embodiments to schedule and process requests, because of the inherent in-order processing provided by a queue. Other structures may be used alternatively, provided that analogous ordering is achieved. Therefore, it is intended that the appended claims shall be construed to include both the preferred embodiment and all such variations and modifications as fall within the spirit and scope of the invention.

Appendix A

```
<HASCRIPT name="newMacro" description="" timeout="60000" pausetime="300"
promptall="true" author="" creationdate="">
   <screen name="Screen1" transient="false" entryscreen="true" exitscreen="false">
      <description>
         <oia status="NOTINHIBITED" optional="false" invertmatch="false" />
      </description>
      <actions>
         <prompt name="userid" description="" row="20" col="16" len="8" default=""
            clearfield="true" encrypted="false" movecursor="false" xlatehostkeys="false" />
         <prompt name="password" description="" row="21" col="16" len="8" default=""
            clearfield="true" encrypted="true" movecursor="false" xlatehostkeys="false" />
         <input value="[enter]" row="0" col="0" movecursor="true" xlatehostkeys="true" />
      </actions>
      <nextscreens timeout="0">
         <nextscreen name="Screen2"/>
      </nextscreens>
   </screen>
   <screen name="Screen2" transient="false" entryscreen="false" exitscreen="false">
      <description>
         <oia status="NOTINHIBITED" optional="false" invertmatch="false" />
         <cursor row="23" col="1" optional="false" invertmatch="false" />
         <numfields number="7" optional="false" invertmatch="false" />
         <numinputfields number="1" optional="false" invertmatch="false" />
      </description>
      <actions>
         <input value="[clear]" row="0" col="0" movecursor="true" xlatehostkeys="true" />
      </actions>
         <nextscreens timeout="0" >
            <nextscreen name="Screen3" />
         </nextscreens>
   </screen>
   <screen name="Screen3" transient="false" entryscreen="false" exitscreen="false">
      <description>
         <oia status="NOTINHIBITED" optional="false" invertmatch="false" />
         <cursor row="23" col="1" optional="false" invertmatch="false" />
         <numfields number="5" optional="false" invertmatch="false" />
         <numinputfields number="1" optional="false" invertmatch="false" />
      </description>
      <actions>
         <input value="hra[enter]" row="0" col="0" movecursor="true" xlatehostkeys="true" />
      </actions>
         <nextScreens timeout="0" >
            <nextscreen name="Screen4" />
         </nextscreens>
   </screen>
   <screen name="Screen4" transient="false" entryscreen="false" exitscreen="false">
      <description>
         <oia status="NOTINHIBITED" optional="false" invertmatch="false" />
         <cursor row="6" col="5" optional="false" invertmatch="false" />
         <numfields number="46" optional="false" invertmatch="false" />
         <numinputfields number="2" optional="false" invertmatch="false" />
      </description>
      <actions>
         <extract name="menu" srow="6" scol="7" erow="11" ecol="42" />
         <prompt name="selection" description="" row="6" col="5" len="1" default=""
            clearfield="false" encrypted="false" movecursor="false" xlatehostkeys="false" />
         <input value="[enter]" row="0" col="0" movecursor="true" xlatehostkeys="true" />
      </actions>
         <nextscreens timeout="0">
            <nextscreen name="Screen4.1" />
         </nextscreens>
   </screen>
   <screen name="Screen4.1" transient="false" entryscreen="false" exitscreen="false">
   <description>
      <oia status="NOTINHIBITED" optional="false" invertmatch="false" />
      <cursor row="23" col="1" optional="true" invertmatch="false" />
      <numfields number="7" optional="true" invertmatch="false" />
      <numinputfields number="1" optional="true" invertmatch="false" />
   </description>
   <actions>
      <extract name="submenu" srow="5" scol="3" erow="22" ecol="80" />
      <input value="[pf3]" row="0" col="0" movecursor="true" xlatehostkeys="true" />
```

-continued

Appendix A

```
    </actions>
      <nextscreens timeout="0" >
        <nextscreen name="Screen4.2" />
      </nextscreens>
  </screen>
  <screen name="Screen4.2" transient="false" entryscreen="false" exitscreen="false">
    <description>
      <oia status="NOTINHIBITED" optional="false" invertmatch="false" />
      <cursor row="23" col="1" optional="true" invertmatch="false" />
      <numfields number="7" optional="true" invertmatch="false" />
      <numinputfields number="1" optional="true" invertmatch="false" />
    </description>
    <actions>
      <input value="[pf3]" row="0" col="0" movecursor="true" xlatehostkeys="true" />
    </actions>
      <nextscreens timeout="0" >
        <nextscreen name="Screen4.3" />
      </nextscreens>
  </screen>
  <screen name="Screen4.3" transient="false" entryscreen="false" exitscreen="false">
    <description>
        <oia status="NOTINHIBITED" optional="false" invertmatch="false" />
        <string value="Ready; T=" row="1" col="1" erow="24" ecol="80" casesense="true"
            optional="false" invertmatch="false" />
        <cursor row="23" col="1" optional="true" invertmatch="false" />
        <numfields number="7" optional="true" invertmatch="false" />
        <numinputfields number="1" optional="true" invertmatch="false" />
    </description>
    <actions>
      <input value="logoff[enter]" row="0" col="0" movecursor="true" xlatehostkeys="true" />
    </actions>
      <nextscreens timeout="0" >
        <nextscreen name="Screen5" />
      </nextscreens>
  </screen>
  <screen name="Screen5" transient="false" entryscreen="false" exitscreen="true">
    <description>
      <oia status="NOTINHIBITED" optional="false" invertmatch="false" />
    </description>
    <actions>
    </actions>
  </screen>
</HASCRIPT>
```

What is claimed is:

1. A computer program product for synchronizing replicated data, the computer program product embodied on one or more computer-readable media and comprising:

computer-readable program code means for storing one or more first objects as replicated read-access objects in a first cache for responding to read requests against the first objects, wherein (1) a set of input properties and values thereof is stored with or associated with each replicated read-access object and (2) refresh logic specifying how to refresh each of the replicated read-access objects is stored with or associated with the replicated read-access object or a group of replicated read-access objects;

computer-readable program code means for storing one or more second objects as replicated write-access objects in a second cache for responding to update requests against the it second objects, wherein (1) a set of input properties is stored with or associated with each replicated write-access object and (2) update logic specifying how to update each of the replicated write-access objects is stored with or associated with the replicated write-access object or a group of replicated write-access objects;

computer-readable program code means for receiving read requests against one or more of the first objects;

computer-readable program code means for receiving update requests against one or more of the second objects;

computer-readable program code means for responding to the read requests using the replicated read-access objects;

computer-readable program code means for queuing the update requests, along with the input properties and values thereof which are to be used for performing each update request, as queued update requests on an update queue;

computer-readable program code means for scheduling a refresh of a selected replicated read-access object by queuing the selected replicated read-access object or a reference thereto as a queued refresh request on a refresh queue;

computer-readable program code means for determining that a replication is to be performed; and computer-readable program code means for performing the replication to refresh the replicated read-access objects and the replicated write-access objects by processing the queued refresh requests on the refresh queue and the queued update requests on the update queue.

2. The computer program product according to claim 1, wherein a separate refresh queue and a separate update queue is created for each of one or more back-end data sources to be accessed during operation of the computer-readable program code means for performing the replication.

3. The computer program product according to claim 1, wherein the computer-readable program code means for performing the replication further comprises:
   computer-readable program code means for executing the refresh logic stored with or associated with selected replicated read-access objects for which the queued refresh requests are queued; and
   computer-readable program code means for executing the update logic stored with or associated with selected replication write-access objects for which the queued update requests are queued.

4. The computer program product according to claim 1, wherein a first caching policy of the refresh queue is set to refresh the replicated read-access objects upon making a connection to a first back-end data source and a second caching policy of the update queue is set to perform the queued update requests on the update queue upon making the connection to the first back-end data source or upon making a connection to a second back-end data source.

5. The computer program product according to claim 4, wherein operation of the computer-readable program code means for performing the replication is triggered according to one or both of the first caching policy or the second caching policy.

6. The computer program product according to claim 1, further comprising:
   computer-readable program code means for connecting to one or more back-end data sources prior to operation of the computer-readable program code means for performing the replication; and
   computer-readable program code means for disconnecting from the one or more back-end data sources after operation of the computer-readable program code means for performing the replication.

7. The computer program product according to claim 1, wherein the computer-readable program code means for performing the replication further comprises computer-readable program code means for offloading the replication to a remote device.

8. The computer program product according to claim 7, wherein the computer-readable program code means for offloading the replication to the remote device further comprises:
   computer-readable program code means for packaging the refresh queue and update queue for sending to the remote device;
   computer-readable program code means for sending the packaged queues to the remote device;
   computer-readable program code means for receiving a response from the remote device which indicates that the offloaded replication has been performed;
   computer-readable program code means for refreshing the replicated read-access objects, responsive to operation of the computer-readable program code means for receiving the response; and
   computer-readable program code means for purging the refresh queue and update queue, responsive to operation of the computer-readable program code means for refreshing.

9. The computer program product according to claim 8, wherein the received response comprises information to use during operation of the computer-readable program code means for refreshing.

10. The computer program product according to claim 9, wherein the received response further comprises an Extensible Markup Language (XML) representation of the information to use.

11. The computer program product according to claim 8, wherein the computer-readable program code means for packaging further comprises computer-readable program code means for creating an Extensible Markup Language (XML) representation of the refresh queue and the update queue.

12. The computer program product according to claim 8, further comprising:
   computer-readable program code means for connecting to the remote device prior to operation of the computer-readable program code means for sending the packaged queues; and
   computer-readable program code means for disconnecting from the remote device after operation of the computer-readable program code means for receiving the response.

13. The computer program product according to claim 1, wherein the computer-readable program code means for performing the replication further comprises:
   computer-readable program code means for processing the queued update requests on the update queue, further comprising:
      computer-readable program code means for setting the input properties of a selected replicated write-access object against which the queued update request is to be performed using the queued input property values; and
      computer-readable program code means for executing the update logic stored with or associated with the selected replicated write-access object using the input properties and values thereof; and
   computer-readable program code means for processing the queued refresh requests on the refresh queue, after operation of the computer-readable program code means for processing the queued update requests, by executing the refresh logic stored with or associated with selected replicated read-access objects for which the queued refresh requests are queued, thereby refreshing the selected replicated read-access objects.

14. The computer program product according to claim 13, further comprising:
   computer-readable program code means for connecting to one or more back-end data sources prior to operation of the computer-readable program code means for processing the queued update requests; and
   computer-readable program code means for disconnecting from the one or more back-end data sources after operation of the computer-readable program code means for processing the queued refresh requests.

15. The computer program product according to claim 1, wherein the computer-readable program code means for determining that the replication is to be performed comprises computer-readable program code means for detecting that a connection to a back-end data source has been made.

16. A system for synchronizing replicated data, comprising:
   means for storing one or more first objects as replicated read-access objects in a first cache for responding to read requests against the first objects, wherein (1) a set of input properties and values thereof is stored with or associated with each replicated read-access object and (2) refresh logic specifying how to refresh each of the replicated read-access objects is stored with or associated with the replicated read-access object or a group of replicated read-access objects;

means for storing one or more second objects as replicated write-access objects in a second cache for responding to update requests against the second objects, wherein (1) a set of input properties is stored with or associated with each replicated write-access object and (2) update logic specifying how to update each of the replicated write-access objects is stored with or associated with the replicated write-access object or a group of replicated write-access objects;

means for receiving read requests against one or more of the first objects;

means for receiving update requests against one or more of the second objects;

means for responding to the read requests using the replicated read-access objects;

means for queuing the update requests, along with the input properties and values thereof which are to be used for performing each update request, as queued update requests on an update queue;

means for scheduling a refresh of a selected replicated read-access object by queuing the selected replicated read-access object or a reference thereto as a queued refresh request on a refresh queue;

means for determining that a replication is to be performed; and means for performing the replication to refresh the replicated read-access objects and the replicated write-access objects by processing the queued refresh requests on the refresh queue and the queued update requests on the update queue.

17. The system according to claim 16, wherein a separate refresh queue and a separate update queue is created for each of one or more back-end data sources to be accessed during operation of the means for performing the replication.

18. The system according to claim 16, wherein the means for performing the replication further comprises:

means for executing the refresh logic stored with or associated with selected replicated read-access objects for which the queued refresh requests are queued; and means for executing the update logic stored with or associated with selected replication write-access objects for which the queued update requests are queued.

19. The system according to claim 16, wherein a first caching policy of the refresh queue is set to refresh the replicated read-access objects upon making a connection to a first back-end data source and a second caching policy of the update queue is set to perform the queued update requests on the update queue upon making the connection to the first back-end data source or upon making a connection to a second back-end data source.

20. The system according to claim 19, wherein operation of the means for performing the replication is triggered according to one or both of the first caching policy or the second caching policy.

21. The system according to claim 16, further comprising:

means for connecting to one or more back-end data sources prior to operation of the means for performing the replication; and means for disconnecting from the one or more back-end data sources after operation of the means for performing the replication.

22. The system according to claim 16, wherein the means for performing the replication further comprises means for offloading the replication to a remote device.

23. The system according to claim 22, wherein the means for offloading the replication to the remote device further comprises:

means for packaging the refresh queue and update queue for sending to the remote device;

means for sending the packaged queues to the remote device;

means for receiving a response from the remote device which indicates that the offloaded replication has been performed;

means for refreshing the replicated read-access objects, responsive to operation of the means for receiving the response; and means for purging the refresh queue and update queue, responsive to operation of the means for refreshing.

24. The system according to claim 23, wherein the received response comprises information to use during operation of the means for refreshing.

25. The system according to claim 24, wherein the received response further comprises an Extensible Markup Language (XML) representation of the information to use.

26. The system according to claim 23, wherein the means for packaging further comprises means for creating an Extensible Markup Language (XML) representation of the refresh queue and the update queue.

27. The system according to claim 23, further comprising:

means for connecting to the remote device prior to operation of the means for sending the packaged queues; and means for disconnecting from the remote device after operation of the means for receiving the response.

28. The system according to claim 16, wherein the means for performing the replication further comprises:

means for processing the queued update requests on the update queue, further comprising:

means for setting the input properties of a selected replicated write-access object against which the queued update request is to be performed using the queued input property values; and means for executing the update logic stored with or associated with the selected replicated write-access object using the input properties and values thereof; and means for processing the queued refresh requests on the refresh queue, after operation of the means for processing the queued update requests, by executing the refresh logic stored with or associated with selected replicated read-access objects for which the queued refresh requests are queued, thereby refreshing the selected replicated read-access objects.

29. The system according to claim 28, further comprising:

means for connecting to one or more back-end data sources prior to operation of the means for processing the queued update requests; and means for disconnecting from the one or more back-end data sources after operation of the means for processing the queued refresh requests.

30. The system according to claim 16, wherein the means for determining that the replication is to be performed comprises means for detecting that a connection to a back-end data source has been made.

31. A method performed by one or more computers for synchronizing replicated data, comprising the steps of:

storing one or more first objects as replicated read-access objects in a first cache for responding to read requests against the first objects, wherein (1) a set of input properties and values thereof is stored with or associated with each replicated read-access object and (2) refresh logic specifying how to refresh each of the replicated read-access objects is stored with or associated with the replicated read-access object or a group of replicated read-access objects;

storing one or more second objects as replicated write-access objects in a second cache for responding to update requests against the second objects, wherein (1) a set of input properties is stored with or associated with each replicated write-access object and (2) update logic specifying how to update each of the replicated write-access objects is stored with or associated with the replicated write-access object or a group of replicated write-access objects;

receiving read requests against one or more of the first objects;

receiving update requests against one or more of the second objects;

responding to the read requests using the replicated read-access objects;

queuing the update requests, along with the input properties and values thereof which are to be used for performing each update request, as queued update requests on an update queue;

scheduling a refresh of a selected replicated read-access object by queuing the selected replicated read-access object or a reference thereto as a queued refresh request on a refresh queue;

determining that a replication is to be performed; and performing the replication to refresh the replicated read-access objects and the replicated write-access objects by processing the queued refresh requests on the refresh queue and the queued update requests on the update queue.

32. The method according to claim 31, wherein a separate refresh queue and a separate update queue is created for each of one or more back-end data sources to be accessed during the step of performing the replication.

33. The method according to claim 31, wherein the step of performing the replication further comprises the steps of:
  executing the refresh logic stored with or associated with selected replicated read-access objects for which the queued refresh requests are queued; and
  executing the update logic stored with or associated with selected replication write-access objects for which the queued update requests are queued.

34. The method according to claim 31, wherein a first caching policy of the refresh queue is set to refresh the replicated read-access objects upon making a connection to a first back-end data source and a second caching policy of the update queue is set to perform the queued update requests on the update queue upon making the connection to the first back-end data source or upon making a connection to a second back-end data source.

35. The method according to claim 34, wherein the step of performing the replication is triggered according to one or both of the first caching policy or the second caching policy.

36. The method according to claim 31, further comprising the steps of:
  connecting to one or more back-end data sources prior to performing the replication; and
  disconnecting from the one or more back-end data sources after performing the replication.

37. The method according to claim 31, wherein the step of performing the replication further comprises the step of offloading the replication to a remote device.

38. The method according to claim 37, wherein the step of offloading the replication to the remote device further comprises the steps of:
  packaging the refresh queue and update queue for sending to the remote device;
  sending the packaged queues to the remote device;
  receiving a response from the remote device which indicates that the offloaded replication has been performed;
  refreshing the replicated read-access objects, responsive to the step of receiving the response; and
  purging the refresh queue and update queue, responsive to the step of refreshing.

39. The method according to claim 38, wherein the received response comprises information to use during the refreshing step.

40. The method according to claim 39, wherein the received response further comprises an Extensible Markup Language (XML) representation of the information to use.

41. The method according to claim 38, wherein the packaging step further comprises the step of creating an Extensible Markup Language (XML) representation of the refresh queue and the update queue.

42. The method according to claim 38, further comprising the steps of
  connecting to the remote device prior to sending the packaged queues; and
  disconnecting from the remote device after receiving the response.

43. The method according to claim 31, wherein the step of performing the replication further comprises the steps of:
  processing the queued update requests on the update queue, further comprising the steps of:
    setting the input properties of a selected replicated write-access object against which the queued update request is to be performed using the queued input property values; and
    executing the update logic stored with or associated with the selected replicated write-access object using the input properties and values thereof; and
  processing the queued refresh requests on the refresh queue, after processing the queued update requests, by executing the refresh logic stored with or associated with selected replicated read-access objects for which the queued refresh requests are queued, thereby refreshing the selected replicated read-access objects.

44. The method according to claim 43, further comprising the steps of:
  connecting to one or more back-end data sources prior to processing the queued update requests; and
  disconnecting from the one or more back-end data sources after processing the queued refresh requests.

45. The method according to claim 31, wherein the step of determining that the replication is to be performed comprises the step of detecting that a connection to a back-end data source has been made.

* * * * *